Oct. 26, 1965
L. E. MILLS
3,214,061
DISPENSER FOR CARBONATED BEVERAGES
Filed July 1, 1963
3 Sheets-Sheet 1
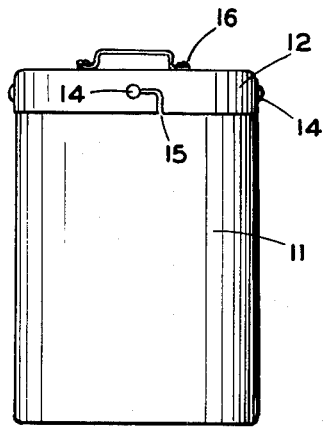
fig.1
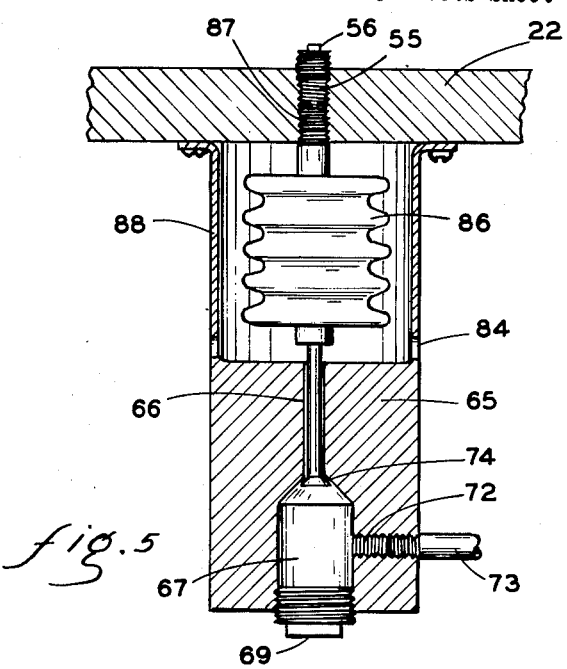
fig.5
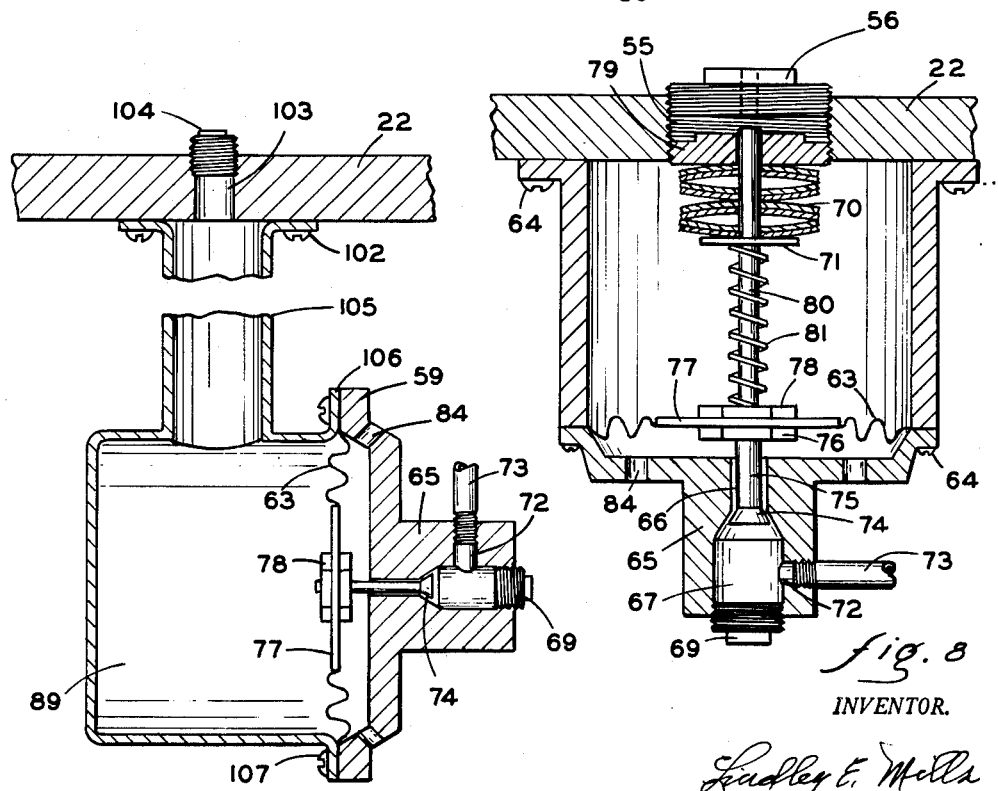
fig.6
fig.8
INVENTOR.
Ludley E. Mills Oct. 26, 1965  L. E. MILLS  3,214,061
DISPENSER FOR CARBONATED BEVERAGES
Filed July 1, 1963  3 Sheets-Sheet 2

INVENTOR.
Lindley E. Mills

Oct. 26, 1965  L. E. MILLS  3,214,061
DISPENSER FOR CARBONATED BEVERAGES
Filed July 1, 1963  3 Sheets-Sheet 3

INVENTOR.
Lindley E. Mills

United States Patent Office 3,214,061
Patented Oct. 26, 1965

3,214,061
DISPENSER FOR CARBONATED BEVERAGES
Lindley E. Mills, 518 Pinehurst Blvd., Kalamazoo, Mich.
Filed July 1, 1963, Ser. No. 291,970
5 Claims. (Cl. 222—54)

This invention relates to a dispenser for carbonated beverages, particularly to a dispenser from which substantially the entire amount of beverage contained therein can be dispensed at essentially the same degree of carbonation. This application is a continuation-in-part of application Ser. No. 73,667, filed Dec. 5, 1960, now Patent No. 3,128,019.

Many beverages, such as certain soft drinks, beer, ale and the like, contain dissolved carbon dioxide at the time of serving. In general, the proportion of dissolved carbon dioxide in the beverage is fairly critical and, for best results, should be maintained with relatively narrow limits even though the limits may vary from beverage to beverage. The optimum proportion of dissolved carbon dioxide is, in most instances, sufficiently great to require that the beverage be kept under pressure in a closed container until such time as it is actually served. If this is not done, a large proportion of the dissolved carbon dioxide will escape from the beverage and the remaining beverage will be "flat" and distasteful.

The requirement that a carbonated beverage be kept in a closed container until it is actually served presents certain difficulties in the storage, shipping and dispensing of such beverages. Thus, in instances where the beverage is to be consumed in the home, it is the universal practice to package the beverage in cans or bottles each holding one or, at most, a few servings so that the entire amount of beverage in the container can be consumed within a short time after the container is opened. This is necessary since the dissolved carbon dioxide will escape fairly rapidly from even a properly chilled carbonated beverage if an attempt is made to store it in an unclosed container. The trouble and cost of packaging and transporting carbonated beverages in such small containers is a major factor in the cost and inconvenience attendant upon the supplying of carbonated beverages to the home and other places not equipped to dispense large numbers of servings of the beverage during a relatively short period of time.

Even in commercial establishments, such as taverns and the like, where large numbers of servings of carbonated beverages are dispensed regularly over short periods of time, the necessity for keeping the beverage under a proper degree of carbonation until the moment it is served presents difficulties which add to the cost and inconvenience to the owner of the establishment and which may, if not provided for properly, injure the reputation of the manufacturer of the beverage because the beverage may not be served under optimum conditions of carbonation. In providing such establishments with carbonated beverages, it is customary to package the beverage in barrels, kegs, half-barrels or other suitable containers which contain several gallons of the beverage. When received by the owner of the establishment, the container and contents are chilled to a suitable serving temperature and the container is then connected by suitable conduit means to a dispensing valve or faucet.

However, it will be noted that unless means are provided in this system of dispensing to prevent it, the degree of carbonation of the beverage remaining in the container will become less and less as more and more of the beverage is dispensed. This arises from the fact that, as beverage is dispensed from the container, the proportion of vapor space in the container becomes greater and greater. Any increase in the vapor space inside the container results in an immediate vaporization of dissolved carbon dioxide from the beverage into the vapor space and a consequent decrease both in the pressure prevailing inside the container and in the degree of carbonation of the beverage remaining in the container. Under such a procedure, and without provision to prevent it, the last portion of the beverage will have so little carbon dioxide remaining dissolved in it that it will be essentially unfit for consumption and will represent a loss to the proprietor of the establishment which may amount to 5 to 20 percent, or more, of the amount of beverage originally in the container.

To overcome the difficulty just pointed out it is common practice in establishments where carbonated beverages are received in, and dispensed from, containers holding more than a very few servings of the beverage, to provide a tank or cylinder of highly compressed carbon dioxide together with a suitable conduit system by means of which carbon dioxide can be conveyed from the tank or cylinder into the beverage container. A suitable reducing valve is installed in the conduit system between the supply cylinder and the beverage container which, when adjusted properly, insures the admittance of just enough carbon dioxide into the beverage container as beverage is drawn therefrom to maintain the pressure in the container at a constant optimum value for the particular beverage concerned. Under such conditions the escape of dissolved carbon dioxide from the beverage remaining in the container into the vapor space as more and more beverage is dispensed from the container is essentially prevented with the result that all of the beverage in the container can be dispensed in usable form. It will be apparent, however, that the cost of the installation thus described and its proper operation by individuals who are frequently not mechanically trained or mechanically minded present burdens on the owner of the establishment which it would be desirable to eliminate.

In addition, even though the installation and operation of the carbonating apparatus just described be provided for with great care, there are certain characteristics inherent in the use of such a system that make it objectionable. Thus, a suitably installed conduit system and reducing valve will maintain the pressure in the beverage container, due to the admission of carbon dioxide into it, at a practically constant value regardless of the temperature prevailing in the container. Since most carbonated beverages are best dispensed at a temperature of about 40° F. it is common practice for the owner of an establishment to set the reducing valve in his carbonating system to maintain the pressure in the beverage container at as nearly as possible the pressure exerted by the particular beverage concerned at 40° F. However, the cold room or cabinet in which the beverage containers are kept for chilling and dispensing is seldom regulated with as great a degree of accuracy as is the setting of the reducing valve. The result is that the beverage may actually be dispensed at a temperature which may be several degrees below or several degrees above 40° F. Since the pressure exerted by a carbonated beverage varies considerably with the temperature of the beverage, this generally leads to considerable undercarbonation or overcarbonation of the beverage as it is actually served. Maintenance of the beverage container and contents during dispensing at a temperature only a few degrees below 40° F. will result in considerable overcarbonation of the beverage in the container while the maintenance of its temperature at only a few degrees above 40° F. will result in considerable undercarbonation of the beverage in the container. Such undercarbonation or overcarbonation may well amount to as much as several percent of the actual amount of carbon dioxide dissolved in the beverage when it is carbonated to the optimum degree. Since the optimum degree of carbonation of a carbonated beverage is determined carefully by the manufacturer, and since care is always taken by the manufacturer to see that the beverage which he supplies is actually carbonated to precisely the optimum degree, it is clear that any deviation permitted by the owner of the establishment where the beverage is served in either the setting of the reducing valve or in the temperature of the beverage during serving will be reflected directly in the quality of the beverage as served and will thus reflect upon the reputation of the manufacturer. This is a problem over which the manufacturer has heretofore had little or no control. The complexity of this problem becomes further evident when it is considered that carbonated beverages often differ from one another in their optimum degrees of carbonation and in their optimum serving temperatures.

The present invention, is therefore, concerned with a method and apparatus by means of which most of the foregoing difficulties in the packaging, transportation and serving of carbonated beverages employing multiple-serving containers can be overcome. According to the present invention, a container for a carbonated beverage is provided which is large enough to contain from several servings to several gallons of the beverage. The container is divided into two beverage chambers, one of which, herein referred as a "first beverage chamber," is adapted to contain a quantity of a beverage carbonated to the optimum degree for serving and to have beverage dispensed therefrom. The other chamber, herein referred to as a "second beverage chamber" is adapted to contain a quantity of the same beverage which has been deliberately overcarbonated. The requisite degree of overcarbonation of the beverage in the second beverage chamber will be apparent as the description proceeds. Suitable means is provided in the way of a suitably valved conduit extending between the two beverage chambers to permit the flow of overcarbonated beverage from the second beverage chamber, under the influence of the higher pressure therein, into the first beverage chamber as beverage is withdrawn from the latter in an amount sufficient to maintain the degree of carbonation of the beverage in the first chamber at the optimum value. Thus, as properly carbonated beverage is dispensed from the first beverage chamber, the vapor space in the first chamber will be increased and the tendency will be for enough of the carbon dioxide dissolved in the remaining beverage to vaporize to fill the increased vapor space at the ambient pressure and for the remaining beverage in the first chamber to thus become undercarbonated to a corresponding degree. However, by making the control means for the valve permitting the flow of overcarbonated beverage from the second beverage chamber into the first beverage chamber repsonsive to change in the pressure in the first beverage chamber so that the valve will open when the pressure in the first chamber drops slightly, the tendency for the beverage remaining in the first beverage chamber to become undercarbonated is overcome. When just enough of the overcarbonated beverage has been admitted into the first beverage chamber to restore the degree of carbonation of the total amount of beverage therein to the optimum value, the valve will again close. This process is repeated as further servings of beverage are withdrawn from the first beverage chamber with the result that, when the beverage in the second beverage chamber is overcarbonated to the proper degree, all of the beverage in both the first and second beverage chambers can be dispensed from the container in the form of beverage carbonated to the optimum degree.

Several modifications of the invention will be described. In certain of the modifications described the apparatus will operate to the best advantage to dispense properly carbonated beverage when the apparatus and contents are brought to the proper serving temperature before dispensing is begun. In other modifications the proper degree of carbonation of the beverage dispensed from the first beverage chamber will be maintained regardless of the temperature of the container and contents and for this reason dispensing of the beverage can be accomplished at any desired temperature without undue overcarbonation or undercarbonation of the dispensed beverage. In any event the invention furnishes a ready means for packaging, shipping and dispensing a carbonated beverage in commercial establishments without the necessity of resorting to the pressuring of the container from an outside source of carbon dioxide and without the necessity of installing and maintaining the apparatus required to effect such pressuring. In addition, the apparatus of the invention furnishes a ready means for storing and dispensing a supply of carbonated beverage in the home and in other places from multi-serving containers without fear of the last portion of the beverage dispensed being unusable due to its becoming undercarbonated. The cost of providing disposable containers for the carbonated beverage is also eliminated since the apparatus of this invention can be refilled and used many times.

Certain advantages of the invention will be apparent from the accompanying drawing wherein, in the interest of clarity, certain features are shown on a somewhat exaggerated scale and wherein;

FIGURE 1 is an elevation of a container embodying features of the invention;

FIGURE 5 is a partial sectional elevation corresponding to a part of FIGURE 2 but showing an alternate modification of certain of the parts;

FIGURE 6 is a partial sectional elevation corresponding to a part of FIGURE 2 but showing still another modification of certain of the parts;

FIGURE 8 is a partial sectional elevation corresponding to a part of FIGURE 2 but showing still a further modification of certain of the parts.

Figure 2:
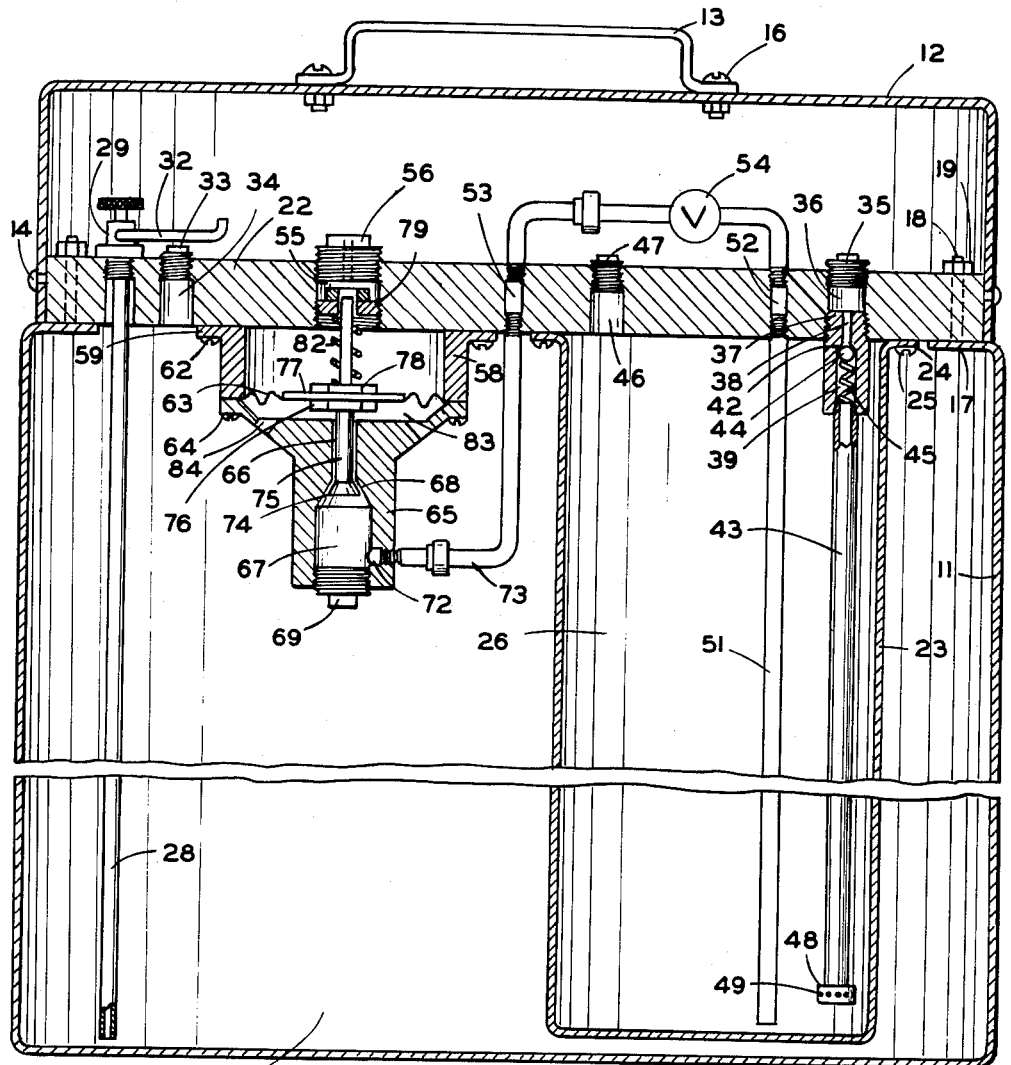
FIGURE 2 is a partial elevation, principally in section, of a container similar to that of FIGURE 1 illustrating one modification of the invention.

It will be understood that the invention is not limited as to size or configuration of the apparatus employed or as to the particular arrangements of the parts so long as they function cooperatively with one another in the way defined in the appended claims. For purposes of simplification, the invention is described with respect to a cylindrical container 11 of FIGURE 1, with essentially flat ends which is adapted to stand on its bottom end when beverage is being dispensed from it. The container 11 is preferably provided with a cover 12 which can be fitted with a suitable handle 13, secured to it as by bolts 16, the cover serving to protect certain of the parts during shipping and storage, to present a more pleasing appearance and to furnish means for carrying the apparatus. The cover can be secured to the container in any suitable way, the way illustrated in the drawing comprising a plurality of cover-retaining pins 14 secured to the container in the way which will be mentioned later, and cooperating with corresponding slots 15 in the cover itself.

As indicated previously, the apparatus of this invention contemplates two beverage chambers. One arrangement of such dual chambers is illustrated in FIGURE 2. The container 11 illustrated is open at one end, e.g. at its top end, and is provided with an inwardly extending encircling flange 17 around its open end. A number of suitable studs 18 are secured to the outer side of the flange 17, as by welding, which, in cooperation with suitable nuts 19, serve to secure a cover plate 22 firmly in place so as to close the open end of the container. A suitable gasket, not shown, can be interposed between the cover plate 22 and the flange 17 in conventional fashion, if necessary, to provide a gas and liquid tight seal. The cover-retaining pins 14 can conveniently be located around the circumference of the cover plate 22.

A second container 23, smaller than the main container 11 and of any convenient configuration, is secured to the under side of the cover plate 22 so that with the cover plate secured in position the second container will project into the interior of the main container 11. In the drawing the second container is in the form of a cylindrical vessel 23 suitably smaller in diameter and length and the main container 11. The container 23 is open at one end, e.g. at its "upper" end, and is provided with an encircling outwardly extending flange 24 which is adapted to lie flat against the under, or inner, surface of the cover plate 22. The flange 24 is secured tightly against the under surface of the cover plate 22 in convenient fashion, as with screws 25. A suitable gasket, not shown, can be interposed between the flange 24 and the cover plate 22 if necessary to insure a liquid and gas tight seal between the flange and the plate. The chamber 26 inside the container 23 is the second beverage chamber referred to previously. The first beverage chamber, also referred to previously, consists of that part 27 of the interior of the main container 11 which is not occupied by the container 23 and by certain of the parts of the apparatus which will be referred to later.

Figure 7:
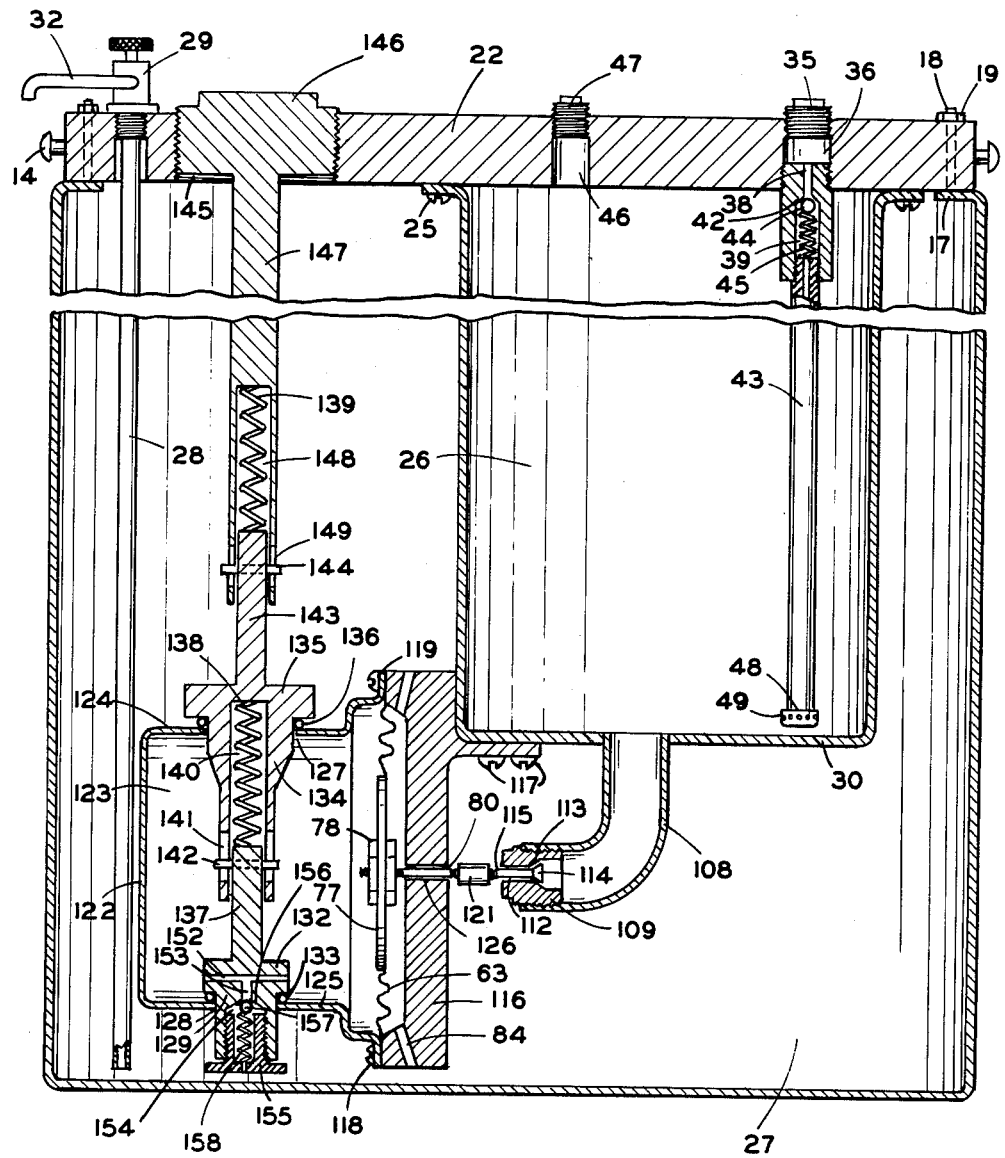
FIGURE 7 is an elevation, principally in section, of a dispenser showing yet a further modification of the invention.

The apparatus is also provided with any suitable means through which a carbonated beverage can be withdrawn or dispensed from the first beverage chamber 27 as desired. In the illustration of FIGURE 2 the dispensing means comprises the dip pipe 28 which extends at its lower end essentially to the bottom of the first beverage chamber so that as much as possible of the beverage in the chamber can be withdrawn through the pipe. The upper end of the dip pipe 28 communicates with any suitable dispensing valve 29 secured in a threaded port in the cover plate 22. In the modification illustrated the valve 29 is provided with a suitable swivel spout 32 which can be swiveled inwardly of the apparatus when desired so as to be enclosed by the cover 12. When the cover 12 is removed the spout 32 can be swiveled, as illustrated in FIGURE 7, so as to deliver dispensed beverage into a glass or other suitable receptacle.

The first beverage chamber is provided with filling means, such as a filler plug 33 suitably threaded to engage a threaded filler port 34 in the cover plate 22. Means are also provided for introducing a beverage into the second beverage chamber 26. This may conveniently be by way of a second filler plug 35 engaging a suitably threaded second filler port 36 in the cover plate 22 located so as to communicate with the second beverage chamber 26. As noted previously the second beverage chamber 26 is adapted to contain an overcarbonated beverage, i.e. a beverage which is carbonated to a degree greater than that desirable for consumption of the beverage. When overcarbonated in this manner the beverage will almost always exert a pressure greater than atmospheric pressure even at a temperature near its freezing temperature. For this reason it is desirable to provide means either for introducing the overcarbonated beverage into the second beverage chamber without reducing the pressure on it to atmospheric pressure or to provide means for carbonating the beverage to the desired degree of overcarbonation after it has been introduced into the second beverage chamber 26. Either of these methods can be employed using suitable means.

One suitable means illustrated in FIGURE 2 comprises a valve body 37 adapted to be screwed into the inner end of the filler port 36. The valve body is bored axially with a small valve bore 38 at its upper end and a somewhat enlarged bore 39 at its lower end, the enlarged bore being threaded internally to receive the threaded end of a delivery tube 43. A valve seat 42 is formed intermediate the small and large bores 38 and 39 and is adapted to accommodate a suitable valve, such as a ball 44, which when seated effectively prevents leakage of liquid or gas upwardly through the bores 38 and 39. A suitable compression spring is preferably installed in the enlarged bore 39 so that it bears at its upper end against the ball 44 and at its lower end against the end of the delivery tube 43 thus insuring proper seating of the ball 44 on the seat 42. The delivery tube is preferably prolonged downwardly so that its lower end is relatively near the bottom end of the container 23. The second beverage chamber 26 is also conveniently provided with a vent such as a small vent bore 46 and a vent plug 47 in the cover plate 22.

To fill the second beverage chamber with beverage which is already overcarbonated, it is only necessary to remove the plug 35 and to replace it with suitable equipment for pumping under positive pressure the requisite amount of overcarbonated beverage into the chamber 26. Usually appproximately 5% of the chamber is left as a vapor space to eliminate any possibility of the development of hydrostatic pressure in the chamber should the temperature become elevated unduly. Alternatively a beverage carbonated to a degree less than the degree of overcarbonation desired, or entirely uncarbonated, can be pumped into the second beverage chamber and carbon dioxide forced into the chamber past the ball 44. In this instance it is sometimes advisable to fit the lower end of the delivery tube 43 with a sparger 48 to insure the division of the carbon dioxide gas into small bubbles as it leaves the tube 43. In the illustration shown the sparger 48 consists of a cap provided with a number of small ports 49 which is threaded onto the end of the tube 43. The degree of overcarbonation of the beverage in the chamber 26 can be regulated by measuring the pressure required to force carbon dioxide gas into the chamber, due allowance being, of course, made for the pressure required to unseat the ball 44.

When filling the second beverage chamber 26 it is often desirable to first sweep the air out of the chamber with carbon dioxide gas. This can be accomplished readily by removing the vent plug 47 and blowing a stream of carbon dioxide gas through the delivery pipe 43 into the chamber and out through the vent 46 and then replacing the vent plug 47 before the beverage is introduced into the chamber. In this way any adverse effect of oxygen on the beverage in the chamber 26 can be avoided and the pressure prevailing in the chamber will be precisely that exerted by the overcarbonated beverage. The filler plug 35 is, of course, eventually reseated tightly.

The first beverage chamber 27 is generally filled with beverage which is carbonated to essentially the desired degree for serving since such properly carbonated beverages can generally be handled under atmospheric pressure without undue loss of carbon dioxide if cooled to about 32 degrees F., or even slightly below. It is thus generally possible merely to remove the first filler plug 33 and to insert a suitable delivery pipe through the port 34 and to then introduce the properly carbonated beverage into the first beverage chamber. Generally, it is advisable for the delivery pipe to extend to as near the bottom of the container 11 as is convenient to avoid undue agitation and foaming of the carbonated beverage. The first beverage chamber, like the second beverage chamber, can be filled completely with beverage except for approximately 5 percent of its volume which should be left to guard against the development of hydrostatic pressure at unduly elevated temperatures.

Although it is generally possible, when convenient, to introduce a properly carbonated beverage into the first beverage chamber 27 under atmospheric pressure in the way just described, it is pointed out that if this procedure is undesirable the first filler port 34 can be provided with a valve arrangement and delivery tube corresponding in function to those illustrated and described for the second filler port 36. The properly carbonated beverage can then be pumped into the first beverage chamber or the beverage itself can be introduced into the chamber and carbonated therein in precisely the same way as described for the overcarbonated beverage in the second beverage chamber 26. It will be noted that in either of these two instances the air can be flushed out of the first beverage chamber preceding introduction of the beverage by a stream of carbon dioxide gas while maintaining the valve 29 in an open position. In many instances it may be desirable to first flush the air from both of the chambers 26 and 27 with carbon dioxide and to then introduce the beverage in an essentially uncarbonated state into the two chambers and, after shipping and storage, to carbonate the beverage in each chamber to the requisite degree.

As has been mentioned previously the apparatus of the invention comprises valve means of any suitable kind for releasing overcarbonated beverage automatically from the second beverage chamber into the first beverage chamber to maintain the degree of carbonation of the beverage in the first chamber at a desired value. One such means is illustrated in FIGURE 2 wherein the cover plate 22 is provided with a port 52 communicating with the second beverage chamber and with a port 53 communicating with the first beverage chamber. A suitable dip pipe 51 is screwed into the inner end of the port 52 and extends essentially to the bottom of the second container 23. The ports 52 and 53 are connected outside of the first and second beverage chambers by an assembly of suitable tubes and fittings with a shut off valve 54 installed in the line between the two ports. The purpose of the valve 54 will be apparent as the description proceeds.

Figures 3, 4:
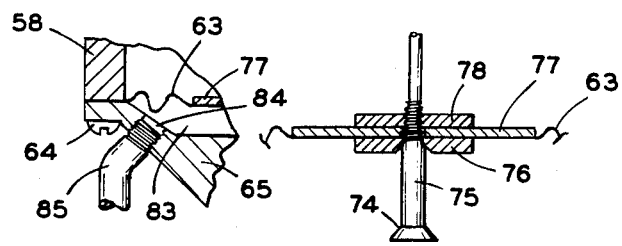
FIGURE 3 is a partial sectional elevation somewhat enlarged, corresponding to a part of FIGURE 2 but showing an alternate arrangement of certain of the parts.
FIGURE 4 is a partial sectional elevation, somewhat enlarged, of certain of the parts of FIGURE 2.

The cover plate 22 is also provided with a suitable regulator port 55 which can be threaded internally to receive a suitable plug 56. The inner end of the regulator port is surrounded with a diaphragm support member 58, conveniently a cylindrical member of suitable length with an outwardly extending flange 59 integral with one end of the member. Suitable screws 62 are employed to secure the flange 59 to the under surface of the cover plate 22, a suitable gasket, not shown, being interposed between the flange 59 and the plate 22, if desirable or necessary, to provide a tight joint. The end of the member 58 opposite the plate 22 is cut off square and is adapted to receive the periphery of a circular diaphragm 63. The diaphragm is retained in place by being clamped, as with screws 64, between the squared off face of the member 58 and the cooperating face of a valve body member 65. The valve body member 65 is bored axially to form a valve bore 66 and a valve chamber 67 with a valve seat 68 lying intermediate the bore and the chamber. The valve chamber 67 is closed as with a threaded plug 69 and communicates by way of a suitable inlet port 72 and appropriate conduit means 73 with the inner end of the port 53. A suitable valve 74 secured to a valve stem 75 is mounted in the valve chamber 67 so as to cooperate with the valve seat 68 and close the valve bore 66. The valve stem 75, as shown in enlarged section in FIGURE 4, passes through the center of the diaphragm 63 and is secured thereto in liquid-tight fashion.

One such securing means comprises a face plate 76 with a beveled bore adapted to fit on a beveled shoulder of the valve stem 75 together with a diaphragm backing plate 77 and a suitable nut 78 running on threads on the valve stem 75. By tightening the nut 78 the face plate 76 can be forced into liquid and gas tight seated position on the valve stem shoulder and the diaphragm can be clamped between the face plate and the backing plate, also in liquid and gas tight condition. The valve stem 75 is prolonged beyond the nut 78 for a suitable distance and is surrounded by a coil spring 82 under compression, one end of the spring bearing against the nut 78 and the other end against a threaded runner 79 which engages the internally threaded regulator port 55. By removing the plug 56 and rotating the runner 79 the pressure exerted by the spring 82 on the nut 78 can be adjusted as desired.

The end of the valve bore 66 opposite the valve seat 68 opens into the diaphragm chamber 83 and this chamber in turn communicates with the first beverage chamber 27 by way of suitable ports 84. It will thus be seen that the pressure in the diaphragm chamber 83 is at all times equal to the pressure in the first beverage chamber 27 and that, with the valve 54 open, the pressure in the valve chamber 67 is equal to the pressure in the second beverage chamber. In practice, the tension exerted by the spring 82 on the nut 78 is adjusted so as to be as nearly as possible equal to the total pressure in excess of atmospheric pressure exerted by the beverage in the diaphragm chamber 83 when the beverage in the first beverage chamber 27 is at the proper temperature and is carbonated to the proper degree for serving. Should the pressure in the first beverage chamber 27 fall below that necessary to balance the pressure of the spring 82 on the nut 78, e.g. when beverage is withdrawn from the first beverage chamber, the diaphragm 63 will flex toward the valve seat 68, the value 74 will be unseated and overcarbonated beverage from the second beverage chamber 26 will flow by way of the ports 66 and 84 from the valve chamber 67 into the first beverage chamber 27. As soon as the pressure in the first beverage chamber is restored to the proper dispensing pressure by introduction of overcarbonated beverage the pressure exerted on the diaphragm chamber side of the diaphragm 63 will become sufficient to overcome the pressure of the spring and to flex the diaphragm in the direction away from the valve seat 68 and cause the valve 74 to be seated. The introduction of further amounts of overcarbonated beverage into the first beverage chamber 27 is thus prevented until such time as further quantities of beverage are dispensed from the first beverage chamber.

In some instances it may be desirable to introduce the overcarbonated beverage below the surface of the beverage remaining in the first beverage chamber to promote the formation of a more uniform mixture. In this instance it is convenient to provide only one port 84 connecting the diaphragm chamber with the first beverage chamber, and, as shown in somewhat enlarged form in FIGURE 3, to provide a suitable delivery pipe 85 which is threaded into the port 84 and which extends essentially to the bottom of the first beverage chamber. The introduced overcarbonated beverage is thus afforded a maximum opportunity for mixing rapidly with the carbonated beverage already in the first beverage chamber.

Generally speaking the plug 56 and runner 79 are provided with small holes to insure the existence of atmospheric pressure in the space between the runner 79 and the diaphragm 63. Thus, the outer side of the diaphragm is at all times subject to atmospheric pressure which, together with the essentially constant pressure of the spring 82, means that the pressure on the spring side of the diaphragm is to all intents and purposes independent of temperature whereas the pressure on the opposite side of the diaphragm is dependent to a considerable extent upon the temperature. For this reason it is advisable in this modification of the invention to close the valve 54 prior to introducing beverage into the first and second beverage chambers and to open it only after the container has been installed in its dispensing position and allowed to reach a dispensing temperature. Under such conditions essentially all of the beverage contained in the first and second beverage chambers will, if each is carbonated to the requisite degree when the chambers are filled, be available for dispensing at a degree of carbonation suitable for consumption.

Although the relative volumes of the first and second beverage chambers with respect to one another can vary widely, it will be observed that certain advantages accrue if the volume of the second beverage chamber is relatively large with respect to the volume of the first beverage chamber. The degree of overcarbonation of the beverage in the second beverage chamber at the beginning of the dispensing operation will, of course, for best operation of the apparatus, depend upon the degree of carbonation desired in the dispensed beverage and the volume of the second beverage chamber with respect to the volume of the first beverage chamber. In general, the degree of overcarbonation of the beverage in the second beverage chamber at the beginning of the dispensing operation should be such that the excess of carbon dioxide dissolved in the beverage over the amount dissolved therein under proper degree of carbonation for consumption is sufficient to fill both the first and second beverage chambers with carbon dioxide gas under a pressure equal to the pressure exerted by the properly carbonated beverage at its dispensing temperature. It is advisable, therefore, to construct the apparatus with the volume of the second beverage chamber as large as convenient in comparison to the volume of the first beverage chamber to reduce to a corresponding degree the pressure exerted by the beverage in the second beverage chamber. Often the volume of the second beverage chamber is conveniently from one to two times the volume of the first beverage chamber, but the invention is not limited in this respect. However, even though often advisable, it is not essential that the volume of the second beverage chamber be greater than the volume of the first beverage chamber. In fact, it may be less if desired.

In a further modification illustrated particularly in FIGURE 5, the diaphragm assembly of FIGURE 2 can be replaced with a suitable bellows 86 the supporting stem 87 of which is adjustably threaded into a regulator port 55 in the cover plate 22. The valve body 65 is in this instance provided with a skirt 88 defining a bellows chamber of suitable shape and dimensions which communicates with the first beverage chamber by way of suitable ports 84, the bellows thus being at all times subject to the pressure existing in the first beverage chamber. From what has been said before it is apparent that a slight drop in pressure in the first beverage chamber will cause the bellows 86 to increase in length and the valve 74 to open thus permitting the flow of beverage from the second beverage chamber under the higher pressure prevailing therein into the first beverage chamber until the pressure therein is restored to the desired dispensing pressure whereupon the bellows is compressed longitudinally sufficiently to close the valve 74.

As in the case of the modification of FIGURE 2, the modification of FIGURE 5 operates to best advantage when the two beverage chambers are charged with beverage under the proper degrees of carbonation with the valve 54 closed and kept closed until the entire apparatus and contents have attained practically the desired dispensing temperature. It will be noticed that in the modifications of both FIGURES 2 and 5 the dispensing of beverage from the first beverage chamber at a temperature somewhat removed from the dispensing temperature for which the apparatus is adjusted will lead to the dispensing of beverage which is carbonated to some extent to an improper degree. Thus, if the dispensing temperature is too low the tendency will be for the dispensed beverage to be overcarbonated whereas if the dispensing temperature is too high the tendency will be for the dispensed beverage to be undercarbonated. A certain amount of leeway is, however, permissible in the dispensing temperature without undercarbonation or overcarbonation of the beverage to more than a mild degree. For best results, such leeway should be kept as low as conveniently possible.

The modification of FIGURE 6 is adapted to compensate for the variation of pressure with temperature within the first beverage chamber and to maintain the degree of carbonation therein at essentially the same value regardless of the variation in temperature of the apparatus and contents. To accomplish this, a chamber 89, herein referred to as a "regulating" chamber, of any convenient configuration is provided which is secured beneath the end plate 22 as by screws 102 and which can be filled with a carbonated fluid e.g. through a regulating filler port 103 by removing the filler plug 104. The chamber 89 is filled with a carbonated liquid having essentially the same degree of carbonation as the carbonated beverage in the first beverage chamber which is to be dispensed. The regulating chamber 89 is preferably located in the first beverage chamber so that its contents can attain essentially the same temperature as the beverage in the first beverage chamber. The regulating chamber 89 can be filled with properly carbonated water or with a portion of the carbonated beverage itself so long as the change in pressure exerted by the liquid with change in temperature corresponds as closely as possible to the change exerted by the beverage in the first beverage chamber.

The regulating chamber 89 is conveniently circular in cross sectional area with a flexible diaphragm secured across its open end. In the modification shown the main body of the chamber 89 is secured, as by welding, to a standpipe or stem 105 which is provided at its upper end with an out-turned encircling flange which is secured to the under side of the cover plate 22. An open end of the main part of the chamber 89 is also provided with an out-turned flange 106 which fits in face-to-face contact with the flange 59 of the valve body member 65 which can be essentially identical in form and function with the valve body member of FIGURE 2. In this instance, however, no spring is provided to bear against the nut 78. With the arrangement illustrated it will be noted that any increase in pressure exerted by the beverage in the first beverage chamber over that exerted by the carbonated liquid in the regulating chamber 89 will cause the diaphragm 63 to flex away from the valve body 65 and the valve 74 to seat tightly. Should the pressure in the first beverage chamber fall to somewhat less than that in the regulating chamber, e.g. when a portion of the beverage is dispensed, the diaphragm will flex in the direction of the valve body 65 and the valve 74 will become unseated allowing overcarbonated beverage to flow into the first beverage chamber until the pressure therein regains its normal value for dispensing. This same relationship between the pressures in the regulating chamber 89 and in the first beverage chamber will continue even through the temperature of the beverage in the first beverage chamber be allowed to vary widely, provided only that the temperature of the carbonated liquid in the regulating chamber 89 varies accordingly.

The modification illustrated in FIGURE 7 is also adapted to compensate for the variation of pressure with temperature in the first beverage chamber. The container 30 of FIGURE 7 corresponds to the container 23 of FIGURE 2 except that for purposes of convenience it is shown as being somewhat shorter. The container 30 encloses the second beverage chamber 26. A suitable L 108 is welded or otherwise secured in communication with a port in the bottom wall of the container 30, the open end of the L being threaded internally to receive an externally threaded valve body 109. The valve body 109 is provided with a longitudinal valve bore 112 around the inner end of which is formed a valve seat 113. A valve 114 is provided which is adapted to seat on the valve seat 113 and which has a valve stem 115 which projects from the outer end of the valve bore 112.

A suitable bracket 116 is provided and conveniently secured to the bottom wall of the container 30 as by screws 117. The face of the bracket opposite the container 30 is provided with a seat against which can be clamped, as by screws 118, the out-turned flange 119 encircling one end of a cup-shaped member 122 defining a regulating chamber 123. For convenience the member 122 is often made rectangular in cross section so that its opposite walls 124 and 125 are flat and parallel with one another. It is, however, convenient to form the flange 119 and the face of the bracket 116 of circular configuration so that the peripheral section of a circular diaphragm 63 can be clamped between them. The diaphragm is provided with a diaphragm backing plate 77 and a diaphragm nut 78 in much the same manner as illustrated in FIGURE 6. The diaphragm rod 80 extends through a port 126 in the bracket 116 which is coaxial with the valve port 112. The valve stem 115 and the diaphragm rod 80 are secured together in any convenient manner, preferably adjustably, as by a turnbuckle 121.

The bracket 116 is hollowed out to some extent to permit movement of the diaphragm nut, the diaphragm and the diaphragm backing plate in the direction of the valve port 112 as occasion demands. It will thus be noted that with the proper adjustment of the valve stem 115 and with the diaphragm 63 in its neutral position resulting from equal pressure on each of its sides, the valve 114 will be seated and the flow of overcarbonated fluid through the valve port 112 will be prevented. However, should the pressure in the first beverage chamber 27 decrease to even a slight degree with respect to the pressure in the regulating chamber 123, the diaphragm will be displaced in the direction of the valve body 109, the valve 114 will be unseated and overcarbonated beverage will flow through the valve port 112 into the first beverage chamber until the pressure on both sides of the diaphragm 63 is again equalized, at which time the valve 114 again becomes seated.

In the modification of FIGURE 7 provision is made to fill the regulating chamber 123 with the carbonated beverage being dispensed. Furthermore, provision is also made for the essentially complete utilization of the beverage in the regulating chamber 123 as well as of the beverage in both the first and second beverage chambers 27 and 26. Thus, essentially the entire volume of the interior of the main container 11 is available for the transport of carbonated beverage except for the necessary free vapor space to guard against the development of hydrostatic pressure. Furthermore, as will be apparent, all of the beverage from the three chambers can be dispensed as usable carbonated beverage.

One convenient way of providing for the utilization of carbonated beverage in the regulating chamber 123 is illustrated in FIGURE 7 wherein the upper wall 124 of the regulating chamber is provided with an upper valve port 127 and the lower wall 125 is provided with a lower valve port 128. The ports 127 and 128 are coaxial and the port 128 is smaller than the port 127. A lower valve body 129 comprises a central portion which fits loosely in the lower valve port 128 and an upper portion 132 having a diameter greater than the diameter of the port 128 but less than the diameter of the port 127. The lower side of the upper portion 132 extends roughly horizontally and is adapted upon pressure downwardly to close the port 128, a flexible plastic ring 133 frequently being employed to encircle the valve body just below the upper portion 132 and assist in providing a tight closure of the port 128.

A similar valve body 134 is provided for the upper valve port 127. The central part of the body 134 fits the upper port 127 loosely and the upper part 135 of the body 134 has a diameter greater than the port 127 so that when pressed downwardly the part 135 closes the port 127, a flexible plastic ring 136 being interposed between the overhanging part 135 and the upper wall 124 of the regulating chamber.

The stem 137 of the lower valve body 129 extends upwardly for a suitable distance and fits loosely into an axial bore 140 formed in the downwardly projecting lower part of the upper valve body 134. The walls of the bore 140 are provided with oppositely located slots 141 and a transverse pin 142 secured in the upper end of the stem 137 is free to travel in the slots 141. A lower compression valve spring 138 is located in the bore 140 between its upper end and the upper end of the valve stem 137.

The upper valve body 134 is prolonged upwardly in the form of an upper valve stem 143 and is provided with a transverse pin 144 similar to the pin 142. The cover plate 22 is provided with a port 145 which is coaxial with the valve ports 127 and 128 and which is provided with a suitable valve plug 146 having a downwardly depending plug stem or shank which is drilled axially from its lower end for a suitable distance forming a well 148 so as to fit loosely around the upper end of the valve stem 143. The ends of the pin project into and are free to travel slidably in oppositely located slots 149 formed in the wall of the well 148. A compression spring 139 is located in the well 148 with one end bearing on the upper end of the well and the other end bearing on the upper end of the valve stem 143.

The upper end 132 of the lower valve body 129 is drilled transversely as at 152 and vertically as at 153, the vertical bore intersecting the transverse bore. The lower end 154 of the vertical bore 153 is enlarged and threaded internally to receive an externally threaded spring retaining member 155. The intermediate section of the bore is formed as a valve seat 156 to receive a ball valve 157 which generally is held on the seat by a spring 158. The retaining member 155 is bored axially to furnish communication between the first beverage chamber and the interior of the regulating chamber 123, i.e. by way of the ports 153 and 152, when the valve 157 is unseated. As will be mentioned later, the spring 158 is chosen so as to exert a predetermined relatively small force on the ball 157, this force being related to the pressure exerted by the carbonated beverage concerned.

The apparatus of FIGURE 7 is conveniently filled by first filling the second beverage chamber 26 either with overcarbonated beverage or with uncarbonated beverage followed by overcarbonation in the way described in connection with FIGURE 2. The pressure of the beverage in the second beverage chamber on the valve 114 assists in keeping the valve seated during the filling of the first beverage chamber.

To fill the first beverage chamber 27 and the regulating chamber 123 with properly carbonated beverage, the plug 146 is unscrewed and withdrawn from the container through the port 145, the diameter of the port 145 being greater than that of the upper part 135 of the upper valve body 134. It will be noted that by this operation the pin 144 is engaged by the lower ends of the slots 149 and that the pin 142 is engaged by the lower ends of the slots 141 and that both the valve bodies 134 and 129 are lifted from the apparatus. Beverage carbonated to the proper degree for consumption is then poured into the first beverage chamber by way of the port 145 until a sufficient amount of the beverage has been added. It will be noted that in this entire procedure the pressures on the two sides of the diaphragm 63 are equal and that there is no tendency for the valve 114 to be opened.

During the introduction of beverage into the first beverage chamber 27 the regulating chamber 123 becomes filled with beverage at the same degree of carbonation as that in the first beverage chamber. Upon insertion of the filler plug 146 in the port 145 the assemblage of the valve bodies 134 and 129 and associated parts closes the ports 127 and 128 in the manner described previously, thus sealing the regulating chamber 123 against leakage of carbon dioxide or of carbonated beverage into or out of the chamber. It will be noted that effective sealing of the port 127 is maintained by tension exerted by the spring 138. It will be clear that the tension exerted by the spring 139 should be greater than the tension exerted by the spring 138 to insure continuous sealing of the port 127.

In operation, beverage is withdrawn from the first beverage chamber 27, thus causing a slight pressure drop in the first beverage chamber and a flexing of the diaphragm 63 in the direction of the valve body 109 and a consequent slight opening of the valve 114. This allows overcarbonated bevarage to flow through the valve bore 112 into the first beverage chamber until the pressure therein is essentially equal to the pressure exerted by the bevarage in the regulating chamber 123 whereupon the diaphragm 63 flexes in the opposite direction and the valve 114 closes. It will be noted particularly that since under all ordinary conditions of transportation, storage and dispensing the temperature of the beverage in the regulating chamber 123 will be essentially the same as that of the beverage in the first beverage chamber 27, the apparatus is self compensating as to temperature and the beverage in the first beverage chamber will be maintained at the correct degree of carbonation for consumption even though the temperature of the apparatus and contents may vary considerably from the optimum temperature for consumption of the beverage.

It has been mentioned previously that in the modification of FIGURE 7 the entire amount of beverage contained in the second beverage chamber 26, the first beverage chamber 27 and the regulating chamber 123 can be dispensed at essentially the optimum degree of carbonation for consumption if due care is taken in the overcarbonation of the beverage in the second beverage chamber 26. As explained in connection with FIGURE 2, the degree of overcarbonation of the beverage in the second beverage chamber 26 should be sufficient to provide carbon dioxide to fill essentially the first and second beverage chambers with gaseous carbon dioxide under the pressure exerted by the properly carbonated beverage at the dispensing temperature. Under such conditions of overcarbonation of the beverage in the second beverage chamber the overcarbonated beverage will be released as needed into the first beverage chamber to maintain the pressure therein essentially equal to the pressure in the regulating chamber 123. Furthermore, the last portion of the overcarbonated beverage will be released into the first beverage chamber and dispensed therefrom along with the last portion therein. As soon as the first and second beverage chambers are essentially empty of liquid, further opening of the dispensing valve 29 permits the escape of some of the gaseous carbon dioxide filling the first beverage chamber and causes the pressure therein to begin to drop. However, by utilizing a relatively weak spring 158 to keep the ball valve 157 seated, the tension of the spring is overcome by the pressure exerted by the beverage in the regulating chamber 123 as soon as the pressure in the first beverage chamber 27 has fallen by a predetermined amount, e.g. by one or two pounds per square inch. As soon as the ball 157 becomes unseated, beverage escapes from the regulating chamber 123 into the first beverage chamber 27 and upon continued operation of the dispensing valve 29 is dispensed as only slightly undercarbonated beverage which generally is still sufficiently carbonated to avoid its having a noticeably flat taste.

In describing the invention thus far the modifications which provide for maintaining a substantially constant degree of carbonation of the beverage in the first beverage chamber under conditions of variable temperature have included a regulating chamber, such as the chamber 89 of FIGURE 6 or the chamber 123 of FIGURE 7, enclosing a quantity of a regulating fluid, the nature of which has been set forth. However, it is pointed out that means other than a regulating chamber containing a regulating fluid can, if desired, be employed for maintaining the degree of carbonation of the beverage in the first beverage chamber at a substantially constant value even though the temperature of the beverage be variable. One such means is illustrated in FIGURE 8 which corresponds closely to FIGURE 2 except for certain parts and the arrangement thereof which will be mentioned. In the modification of FIGURE 8 the diaphragm 63 is, as in the modification of FIGURE 2, subject on one of its sides to the pressure exerted by the beverage in the first beverage chamber. The diaphragm in the modification of FIGURE 2 is subjected on its opposite side to an essentially constant pressure, i.e. to the pressure exerted by the atmosphere and the compression spring 82. In contrast, the diaphragm in the modification of FIGURE 8 is subjected on its opposite side to a pressure which varies with temperature in essentially the same manner and to essentially the same degree as the pressure exerted by the beverage in the first beverage chamber. To accomplish this effect the compression spring 82 of FIGURE 2 is replaced by, or supplemented with, a suitable temperature-sensitive element which causes the pressure on the diaphragm to vary with the temperature in a manner as nearly as possible equal to the variation with the temperature of the pressure exerted by the beverage in the first beverage chamber. Any suitable temperature-sensitive element can be employed although a preferred element is a conventional bimetallic element of suitable characteristics. Such bimetallic elements are sometimes referred to generally as "thermostat metal" elements. In one arrangement illustrated in FIGURE 8 a suitable number of circular discs 70 each comprising a bimetallic element are provided. Each disc is formed with a central hole so that it can be stacked on the diaphragm rod 80, which in this case can conveniently be an extension of the valve stem 75. The runner 79 is convenientnly provided with a central bore to receive the end of the diaphragm rod 80 so as to maintain its proper alignment. The thermostat elements 70 under the influence of an elevation in temperature assume a dished configuration, the extent of which is related to the change in temperature, and to the characteristics of the particular disc employed. The discs, often referred to in the trade as "creep" discs, are arranged on the diaphragm stem with the same side of successive discs facing in alternate direction. When arranged in this manner the movement of the discs under the influence of temperature change is cumulative. By employing a sufficient number of discs, the amount of movement, or the lengthening of the stack per unit of change in temperature, can be made as great as desired within practical limits.

As shown in FIGURE 8, the assembly of bimetallic discs bears at one end upon the runner 79 and, in the particular modification illustrated, at its other end upon a plate or washer 71 which is free to slide longitudinally on the rod 80. A short compression spring 81 encircles the diaphragm rod 80 between the plate 71 and the nut 78. By selecting a spring 81 with suitable properties and by employing a suitable number of bimetallic discs 70 of appropriate characteristics, it is entirely feasible and practical to provide an arrangement wherein the increase in length of the stack of discs with increase in temperature is just sufficient to increase the compression on the spring 81 by an amount which essentially balances the increase in pressure of the carbonated beverage on the opposite side of the diaphragm caused by the same increase in temperature of the beverage. It is thus apparent that with the arrangement described the degree of carbonation of the carbonated beverage in the first beverage chamber will remain essentially unchanged even though the temperature of the dispensing apparatus and contents be allowed to vary over a considerable range.

Although the employment of a temperature-sensitive element, as exemplified by the creep discs of FIGURE 8, has been described with respect to the maintenance at other than a constant temperature of the preferred degree of carbonation of a beverage by the controlled addition thereto in a beverage chamber of suitable amounts of an overcarbonated beverage, it should be pointed out that such temperature-sensitive elements can also be employed in instances where the chamber containing an overcarbonated beverage is replaced with a chamber of suitable proportions adapted to contain carbon dioxide under a suitable pressure and from which carbon dioxide gas is released into a beverage chamber to maintain the desired pressure therein and, therefore, the desired degree of carbonation of a beverage in the chamber. By employing a suitable carbon dioxide release valve and a suitable assembly containing a plurality of creep discs, e.g. as described in connection with FIGURE 8, or of other suitable temperature-sensitive elements, the opening and closing of the release valve is effected, and the desired degree of carbonation of the beverage is maintained over essentially the entire range of temperature to which the beverage is ordinarily subjected.

It should also be mentioned that, although the invention has been described with particular reference to a dispensing apparatus from which a carbonated beverage can be dispensed by way of a dispensing valve located at the container directly into a glass or other vessel for immediate consumption, the invention contemplates as well the delivery by way of a suitable beverage conduit of carbonated beverage to a dispensing valve located at any suitable distance from the container comprising the first and second beverage chambers. Thus, in the case of a large apparatus, such as might be used in a tavern or the like, it is convenient to locate the container in a cold room during dispensing of beverage from it and to locate the valve through which the beverage is released into a glass or the like at a suitable location removed by any convenient distance from the cold room. On the other hand, in the case of small dispensers adapted to be used in the home the dispensing valve is generally integral with the container as illustrated in some of the figures of the drawing.

I claim:

1. In apparatus for dispensing a carbonated beverage, the combination including:
   a first beverage chamber adapted to contain a beverage carbonated at a predetermined degree suitable for consumption and to have successive portions of the beverage dispensed from the chamber;
   a second beverage chamber associated with the first beverage chamber adapted to contain an overcarbonated beverage carbonated to a degree greater than the beverage in the first beverage chamber;
   conduit means extending between and communicating with the first and second beverage chambers and comprising a release valve whereby overcarbonated beverage can be released from the second beverage chamber into the first beverage chamber;
   valve-actuating means responsive to change in pressure in the first beverage chamber connected with the release valve whereby, as successive portions of carbonated beverage are dispensed from the first beverage chamber, overcarbonated beverage is released from the second beverage chamber into the first beverage chamber;
   and means responsive to change in temperature in the first beverage chamber connected with, and regulating the action of, the valve-actuating means whereby, as the temperature in the first beverage chamber varies, the action of the valve-actuating means is regulated to provide for the release, essentially independently of the temperature in the first beverage chamber, of amounts of overcarbonated beverage sufficient to maintain the degree of carbonation of the beverage in the first beverage chamber at essentially the predetermined value, the conduit means being connected with the second beverage chamber with its end disposed at essentially the lowest point in the chamber when the apparatus is in a position for dispensing whereby essentially all of the overcarbonated beverage can be released into the first beverage chamber before gaseous carbon dioxide enters the conduit.

2. Apparatus as claimed in claim 1 wherein the valve-actuating means comprising a flexible diaphragm subject on one of its sides to the pressure in the first beverage chamber and on the other side to a pressure which is variable with temperature at essentially the same rate as the pressure in the first beverage chamber.

3. Apparatus as claimed in claim 1 wherein the temperature-responsive means comprises a regulating chamber adapted to enclose a suitable quantity of a carbonated liquid the pressure of which varies with change in temperature at essentially the same rate as that of the carbonated beverage in the first beverage chamber.

4. Apparatus as claimed in claim 1 wherein the temperature-responsive means comprises a bimetallic temperature-sensitive element.

5. In apparatus for dispensing a carbonated beverage, the combination including:
   a first chamber adapted to contain a carbonated beverage at a predetermined degree of carbonation and to have successive portions of the beverage dispensed therefrom;
   a second chamber adapted to contain carbon dioxide in a form exerting a pressure greater than that exerted by the carbonated beverage in the first chamber;
   conduit means extending between the first and second chambers and comprising a release valve whereby carbon dioxide can be released from the second chamber into the first chamber;
   valve-actuating means responsive to change in pressure in the first chamber connected with the release valve whereby as successive portions of carbonated beverage are dispensed from the first chamber carbon dioxide is released from the second chamber into the first chamber;
   and temperature-responsive means comprising a bimetallic temperature-sensitive element associated with, and regulating the action of, the valve-actuating means whereby, as the temperature in the first chamber varies, the action of the valve-actuating means is regulated to provide for the release, essentially independently of the temperature in the first chamber, of amounts of carbon dioxide sufficient to maintain the degree of carbonation of the beverage in the first chamber at essentially the predetermined value, the conduit means being connected with the second beverage chamber with its end disposed at essentially the lowest point in the chamber when the apparatus is in a position for dispensing whereby essentially all of the overcarbonated beverage can be released into the first beverage chamber before gaseous carbon dioxide enters the conduit.

References Cited by the Examiner

UNITED STATES PATENTS

| | | | |
|---|---|---|---|
| 663,732 | 12/00 | Coughlin | 222—399 |
| 924,501 | 6/09 | Sala | 222—399 X |
| 2,044,866 | 6/36 | Williams et al. | 222—54 X |
| 2,085,956 | 7/37 | Clarke et al. | 222—1 X |
| 2,096,088 | 10/37 | Copeman | 222—182 X |
| 2,261,080 | 10/41 | Stellhorn | 222—54 X |
| 2,571,433 | 10/51 | Fine et al. | 222—399 X |
| 2,812,109 | 11/57 | Wentz | 222—396 X |
| 2,925,147 | 2/60 | Minera | 222—52 X |
| 3,127,059 | 3/64 | Lawrence | 222—54 |

RAPHAEL M. LUPO, *Primary Examiner.*

Dedication 3,214,061.—*Lindley E. Mills*, Kalamazoo, Mich. DISPENSER FOR CARBONATED BEVERAGES. Patent dated Oct. 26, 1965. Dedication filed June 26, 1968, by the inventor.
Hereby dedicates said patent to the Public.
[*Official Gazette November 19, 1968.*]